United States Patent [19]

Gallagher et al.

[11] Patent Number: 5,682,678
[45] Date of Patent: Nov. 4, 1997

[54] MECHANICAL REPAIR FOR A HONEYCOMB PANEL

[75] Inventors: Daniel J. Gallagher, Tulsa, Okla.; David H. Lafevers, Gordonville, Tex.; David D. Breckenridge, Tulsa, Okla.

[73] Assignee: The Nordam Group, Inc., Tulsa, Okla.

[21] Appl. No.: 556,708

[22] Filed: Nov. 13, 1995

[51] Int. Cl.$^6$ ............................................. B23P 15/00
[52] U.S. Cl. .......................... 29/897.32; 29/525.02; 29/402.15; 29/523; 403/388; 411/45; 411/55; 411/535; 411/536
[58] Field of Search ............................. 29/897.1, 897.32, 29/525.02, 402.12, 402.14, 402.15, 402.17, 523; 403/388, 384, 389; 411/546, 535, 44, 45, 49, 55, 60, 57

[56] References Cited

U.S. PATENT DOCUMENTS

| | | | |
|---|---|---|---|
| 1,835,243 | 12/1931 | Schaffert | 411/546 |
| 2,379,786 | 7/1945 | Bugg et al. | 411/57 |
| 3,076,668 | 2/1963 | Famely | 285/159 |
| 3,270,410 | 9/1966 | Salter et al. | 29/525.02 |
| 3,296,691 | 1/1967 | Bien | 29/525.02 |
| 3,468,091 | 9/1969 | Gerhard | 52/278 |
| 3,526,072 | 9/1970 | Campbell | 52/617 |
| 3,820,297 | 6/1974 | Hurd | 411/44 |
| 3,836,704 | 9/1974 | Coules | 411/44 |
| 4,048,898 | 9/1977 | Salter | 85/77 |
| 4,089,247 | 5/1978 | Dahl et al. | 85/70 |
| 4,102,036 | 7/1978 | Salter | 29/525 |
| 4,244,661 | 1/1981 | Dervy | 403/388 |
| 4,488,437 | 12/1984 | Pere | 29/525.02 |
| 4,499,647 | 2/1985 | Sakamura et al. | 29/526 |
| 4,656,806 | 4/1987 | Leibhard et al. | 52/704 |
| 4,717,612 | 1/1988 | Shackelford | 428/116 |
| 4,934,861 | 6/1990 | Weeks et al. | 403/408.1 |
| 5,040,917 | 8/1991 | Camuffo | 403/408.1 |
| 5,205,689 | 4/1993 | Fischer | 411/54 |

FOREIGN PATENT DOCUMENTS

| | | |
|---|---|---|
| 24 59 608 | 8/1975 | Germany. |
| 885704 | 12/1961 | United Kingdom. |

Primary Examiner—Larry I. Schwartz
Assistant Examiner—Marc W. Butler
Attorney, Agent, or Firm—Head, Johnson & Kachigian

[57] ABSTRACT

A method of reinforcing a sandwich panel having opposed first and second skins spaced apart by a core having a thickness "F" in a manner to preserve the spacing between the skins, including the steps of boring an in-line hole through the panel to provide a hole in both skins and the core of a diameter "A", enlarging the hole in the first skin to a diameter "B", inserting a tubular sleeve into the in-line hole, the sleeve having a length substantially equal to "F" and having an external diameter greater than "A" and slightly less than "B", the first end of the sleeve contacting the inner surface of the second skin, and flaring the second end of the sleeve to an external diameter greater than "B" so that it engages the inner surface of the first skin, and inserting a bolt through the sleeve, the bolt having a head to contact the external surface of the first skin and applying a nut to the bolt to contact the external surface of the second skin so that the skins are held in fixed position by the bolt.

6 Claims, 3 Drawing Sheets

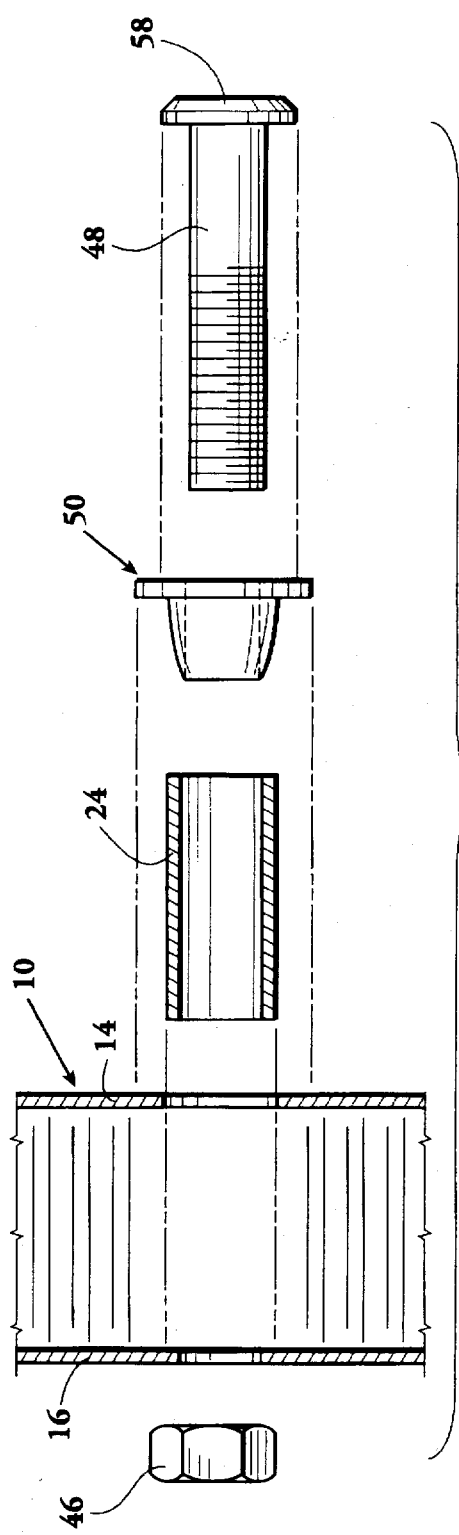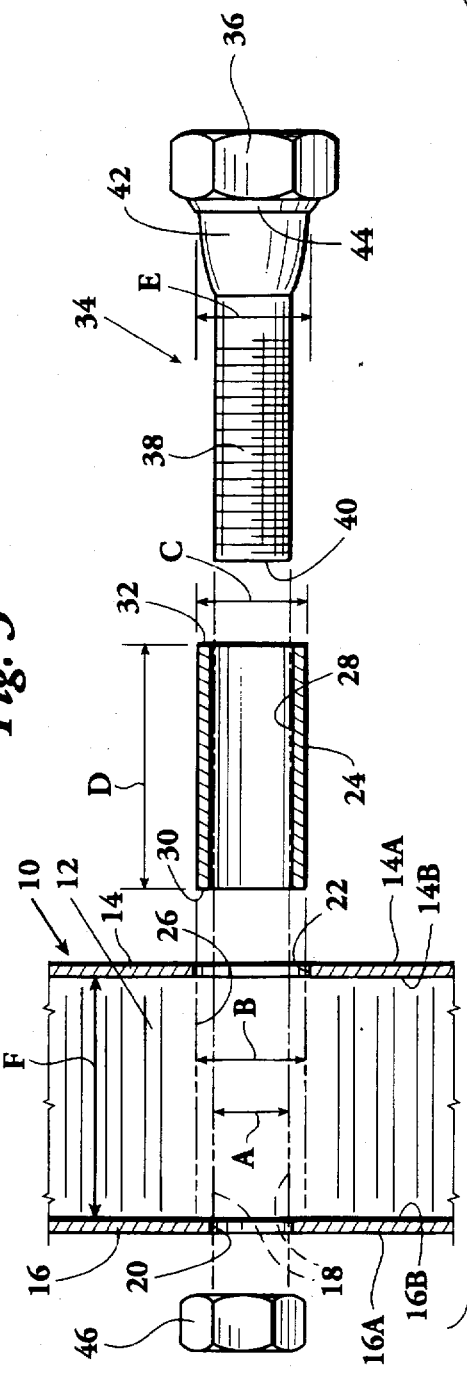

MECHANICAL REPAIR FOR A HONEYCOMB PANEL

CROSS-REFERENCE TO RELATED APPLICATIONS

This application is not related to any pending patent applications.

CROSS-REFERENCE TO MICROFICHE APPENDIX

This application is not referenced in any microfiche appendix.

BACKGROUND OF THE INVENTION

Honeycomb panels are frequently used in the aircraft industry and in other industrial applications. By "honeycomb panel" is meant a panel formed of a relatively thin inner and outer skin secured to a core. While a honeycomb panel is the usual and typical application of the present invention, the invention is not limited to a panel in which the core is of honeycomb configuration but is applicable to any panel having a first and a second skin bonded to a core which may be more generally called a "sandwich panel". The purpose of the invention is to provide means for structurally reinforcing any such panel, that is, any panel having a first and second skin separated by a core.

A specific example of the application of this invention is for reinforcing honeycomb panels utilized on aircraft, such as in structures attached to an aircraft jet engine to reduce engine noise. Because of the high forces, drastic temperature differentials and vibration, the skin of honeycomb panels can become separated from the core or the core itself may destruct. To repair a honeycomb panel in this environment the present procedure is to use rods that are welded to join to the two skins together to thereby entrap the core. This procedure works successfully but is time consuming, particularly due to the high degree of cleanliness which must be established before effective welding can be accomplished. The tail pipe environment in which these panels are used exposes them to oil, soot, and other materials. Cleaning the panels to put them in condition to receive effective and permanent welds is difficult. The invention herein provides a method of reinforcing honeycomb panels in which it is not necessary to thoroughly clean the panels as is required with welding procedures.

The invention herein provides a mechanical system for reinforcing skins bonded to opposed sides of a core material, such as a honeycomb core material. Specifically, the invention herein provides a method and apparatus for installing a Bolt in a sandwich panel in a way to resist delamination of the skins from the core.

For background information relating to structures utilized to reinforce sandwich panels having first and second skins with a core therebetween, reference should be had to the following United States Patents.

| PATENT NO. | INVENTOR | TITLE |
|---|---|---|
| 3076668 | Famely | Fittings For Retaining Cylindrical Members In Place |
| 3468091 | Gerhard | Wall Fasteners |
| 3526072 | Campbell | Load Distributing System For Panels Incorporating Honeycomb Core |
| 4048898 | Salter | Fastener For Multi Metal Stack-Ups |

-continued

| PATENT NO. | INVENTOR | TITLE |
|---|---|---|
| 4089247 | Dahl et al | Blind Fastener |
| 4499647 | Sakamura et al | Blind Nut Fastening Method |
| 4656806 | Leibhard et al | Expansion Anchor Assembly |
| 4717612 | Shakelford | Fasteners For Honeycomb Structures |
| 4934861 | Weeks et al | Attachment Apparatus For External Stores On Thin-Wall Poles |
| 5040917 | Camuffo | Device For Fixing Mechanical Parts To The Body Of A Motor Vehicle |
| 5205689 | Fischer | Expansible Plug |

BRIEF SUMMARY OF THE INVENTION

The invention disclosed herein relates to a method of reinforcing a sandwich panel having opposed first and second skins spaced apart by a core. While the invention is applicable to any type of panel having opposed skins and a core, it is particularly applicable for use with a honeycomb panel assembly. Honeycomb panels are frequently employed in the aviation industry since they provide an exceedingly high strength to weight ratio. The skins of honeycomb panels can be formed of any stiff material and are typically of plastic, fiberglass or metal. Metal honeycomb panels are frequently employed in the aviation industry in harsh environments, such as to provide sound reduction structures that are mounted at the aft end of jet aircraft engines. The sandwich panels in these environments are subjected to dramatic temperature differentials, pressure and vibration. Consequently the panels can delaminate, that is, one or both of the skins detaches from the panel core or the core itself could degrade. Repairing a delamination or damage of this type in this environment is difficult. The invention described herein provides an improved method of accomplishing repairs or reinforcement of a sandwich panel, such as a honeycomb panel.

The first step of the method requires boring an in-line hole through the panel to penetrate the first skin, the core, and the second skin. Next, the hole in the first skin is enlarged to a slightly increased diameter. Third, a tubular sleeve that has circumferential integrity throughout its length is then inserted in the in-line hole, the sleeve having a first end and a second end and a length substantially equal to the thickness of the panel core. The sleeve has an external diameter greater than the in-line hole in the second skin but slightly less than the enlarged hole in the first skin. The first end of the sleeve thereby engages the inner surface of the second skin. In the fourth step, the second end of the tubular sleeve, after being inserted within the drilled hole in the panel, is flared by cold flowing, that is, without destroying the circumferential integrity of the sleeve so that the flared diameter of the second end of the sleeve is enlarged to a size greater than the diameter of the enlarged hole formed in the first end. In this manner, a sleeve is provided within the confines of the core of the skin that is tubular, that is, has an opening through it, with a first end that engages the interior surface of the second skin and a second end that engages the interior surface of the first skin. The sleeve thereby spaces the first and second skins apart at the same spacing as provided by the core. Thereafter, a bolt may be positioned in the sleeve, the bolt having a head at one end with or without a washer that engages the external surface of the first skin and a nut with or without a washer, the washer being integral or separate at the other end that engages the external surface of the second skin so that, when the nut is tightened on the bolt, the first and second skins are held in fixed relationship to each other with the spacings between the interior surfaces defined by the length of the sleeve to thereby maintain the thickness of the skin at the area of repair in conformity with the normal skin thickness. Instead of employing a bolt, a rivet, or another item may be utilized to secure the first and second skins to each other, the rivet extending through the tubular sleeve with an enlarged diameter portion on each end to engage the exterior surfaces of the first and second skins.

A repair system to accomplish this method includes the use of a sleeve in combination with a bolt having a frusto-conical portion adjacent one end. The bolt, when inserted in the sleeve after it is positioned within the drilled hole in a sandwich panel, functions to expand one end of the sleeve. The frusto-conical portion of the bolt may either be integral with the bolt or may be a separate element slidably received on the bolt.

A better understanding of the invention will be obtained from the following detailed description of the preferred embodiment, taken in conjunction with the attached drawings.

DESCRIPTION OF THE DRAWINGS

FIG. 1 is an exploded view showing a sandwich panel, such as a honeycomb panel, in cross-section and showing a tubular sleeve, a bolt and a nut as used in the system to practice the method of the invention.

FIG. 3 is an exploded view, similar to FIG. 1, showing a sandwich panel in cross-section, the panel having an in-line hole drilled therethrough with the hole in the panel first skin being slightly enlarged and showing a tubular sleeve dimensioned to be received in the in-line hole within the panel. A flaring washer that is slideably receivable on a bolt is shown.

FIG. 6 shows how the method and the system of the invention may be employed wherein the flaring washer is utilized in the installation of the sleeve but is removed prior to the final tightening of the bolt that serves to reinforce the panel.

DESCRIPTION OF THE PREFERRED EMBODIMENTS

Figure 4:
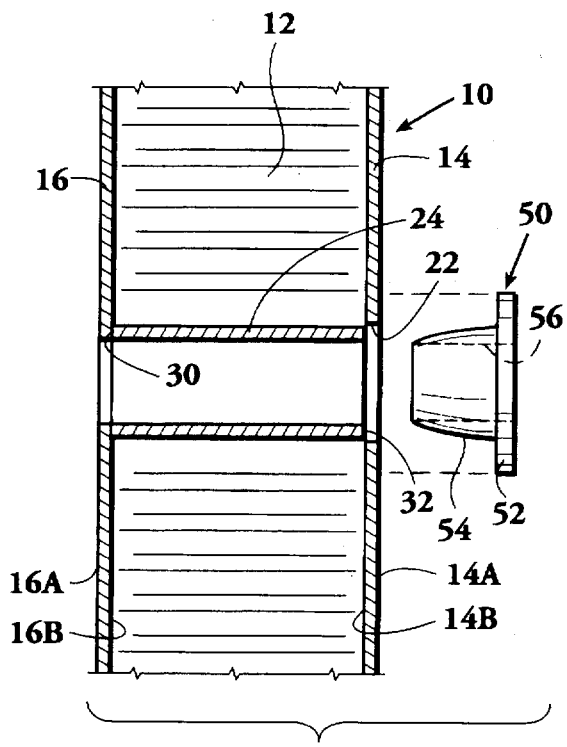
FIG. 4 shows the panel in cross-section with the sleeve positioned within the interior of the panel. The flaring washer is illustrated as it is positioned to be inserted into the panel by means of a bolt to flare one end of the sleeve.

Referring first to FIG. 1, the numeral 10 indicates a sandwich panel which is typically in the form of a honeycomb panel. Panel 10 is formed of three basic components, that is, core 12 which is usually in the form of honeycomb material, first skin 14 and second skin 16. Panel skins 14 and 16 are typically relatively thin sheets of stiff material such as plastic, fiberglass, wood or metal. The present invention is particularly useful in the aircraft industry and in these applications, skins 14 and 16 are typically formed of metal, the metal usually being aluminum, aluminum alloy or, for particularly harsh environments, titanium, titanium alloy or steels. Skins 14 and 16 are bonded to core 12. In some applications, particularly where the panel 10 is subjected to stress, vibration, great temperature variations and so forth, one or the other of skins 14 and 16 can sometimes delaminate from core 12, that is, the bonding between the core and the skin fails causing one or both of the skins 14 and 16 to separate from core 12 or the core itself can degrade.

For reference to a sandwich panel 10, and particularly a honeycomb panel that is exemplary of the type of panel in which the invention is practiced, reference may be had to U.S. Pat. Nos. 5,064,493 entitled "Method of Producing Curved Honeycomb Core Material Having Crimps In One Edge" and 5,126,183 entitled "Curved Paneling Including Honeycomb Core Material Having Crimps In One Edge", which are incorporated herein by reference. These patents teach a method of construction of honeycomb panels and particularly, the method of constructing honeycomb panels of a curved configuration.

Assuming it is the objective of a practitioner to reinforce panel 10 such as to remedy delamination or to prevent the possibility of delamination or core degradation, the method and the system of this invention can be employed.

First skin 14 has an outer surface 14A and an inner surface 14B. In like manner, second skin 16 has an outer surface 16A and an inner surface 16B.

The first step in practicing the method of this invention is to drill an in-line hole through the panel, that is, through first skin 14, core 12 and second skin 16. The in-line hole is indicated by the dotted lines 18, the in-line hole having a diameter "A". The in-line hole 18 forms a hole 20 of diameter "A" in second skin 16 and forms an in-line hole in the first skin 14 of the same diameter. The second step in the method is to enlarge the hole in skin 14 and core 12 to a larger diameter hole 22. The diameter of enlarged diameter hole 22 in skin 14 is indicated by the letter "B". The drilling operation to provide hole 22 in skin 14 is carried out to the full depth of core 12 if core 12 is solid. If core 12 is honeycomb material the core space where the in-line hole is drilled may be clear in which case the second drilling operation may need only penetrate first skin 14.

The thickness of core 12 between first skin inner surface 14B and second skin inner surface 16B is indicated by the letter "F".

The third step in the method of practicing the invention is to insert a tubular sleeve 24 into hole 22 formed in first skin 14 and into the hole 26 of the same diameter formed in core 12, the sleeve having circumferential integrity throughout its length. The external diameter of tubular sleeve 24 is slightly less than "B" so that the sleeve will slide freely through opening 22 in first skin 14 into opening 26 in core 12. The length "D" of sleeve 24 is substantially the same as dimension "F", that is, the spacing between the interior surfaces of first and second skins 14B and 16B. The internal diameter of opening 28 of sleeve 24 is preferably substantially equal to "A", that is, the diameter of the first drilled in-line hole and the diameter of hole 20 in second skin 16.

Sleeve 24 is positioned within panel 10 as shown in FIG. 4. Tubular sleeve 24 has inner end 30 that abuts second skin inner surface 16B and has an outer end 32 that, as shown in FIG. 4, is in the plane of the first skin inner surface 14B.

The second element employed in practicing the method of this invention is bolt 34 having a head 36 at one end and a threaded area 38 adjacent the opposite end 40. Bolt 34 of FIGS. 1 and 2 has, adjacent head 36 an integral flange portion 42. Integral flange portion 42 increases in diameter towards head 36 to a diameter "E" that is substantially equal to "B". Bolt 34 also includes an integral short length frusto-conical portion 44 that preferably is of a length substantially equal to the thickness of first skin 14.

Figure 2:
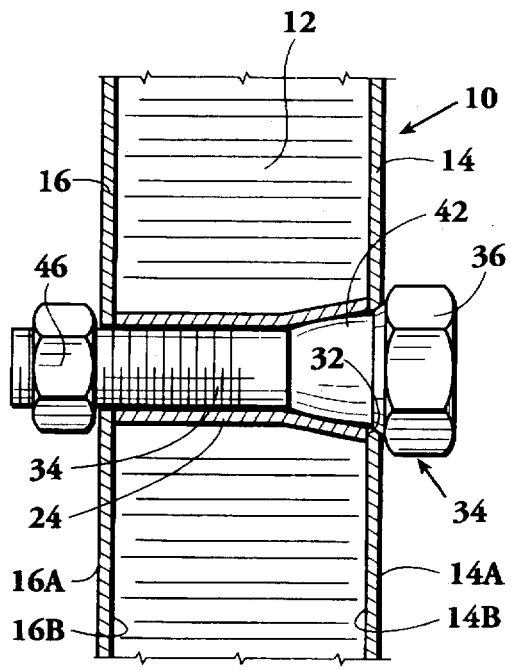
FIG. 2 is a cross-sectional view of the panel of FIG. 1 showing the sleeve in position within the panel and showing the bolt in position as employed to reinforce the panel. The bolt of FIGS. 1 and 2 has an integral flare portion adjacent the bolt head.

With sleeve 24 positioned within core 12 of the sandwich panel, bolt 34 is extended through the sleeve and nut 46 is threaded onto the bolt as shown in FIG. 2. When nut 46 is tightened the bolt integral flange portion 42 is forced into tubular sleeve outer end 32 to swedge, that is, enlarged by cold flowing the sleeve and portion without destroying the circumferential integrity of the sleeve so that the inner end 32 increases in diameter as shown in FIG. 2. As integral flange portion 42 is fully forced into sleeve 24, inner end 32 increases in diameter so that the internal diameter at the sleeve inner end 32 is substantially equal to "E" with the external diameter of the inner end 32 after the swedging operation, being greater than "B". In this way, the enlarged diameter inner end 32 of sleeve 24 engages first skin internal surface 14B in the same way that the inner end 30 of the sleeve engages second skin internal surface 16B. In this way sleeve 24 forms a structural spacer holding the skins apart the distance "F", that is, the normal thickness of core 12.

It can be seen with reference to FIG. 2 that with nut 46 tightened first skin 14 and second skin 16 are held in fixed relationship relative to core 12 and held in fixed spacing with respect to each other with the core therebetween. Thus, the method of this invention employing the enforcing system serves to capture the opposed skins of a sandwich panel, and particularly a honeycomb panel, to support them in their pre-established spacing and in a manner that the skins are not free to separate from each other or from the core.

After bolt 34 has been installed and the inner end 32 of sleeve 24 is expanded as illustrated, as shown in FIG. 2, the bolt may be removed and a different bolt employed or the opening provided by sleeve 24 after bolt 34 is removed can be used such as to attach the panel 10 to another object. However, if bolt 34 is removed it must be replaced by some other element to retain the first and second skins relative to each other with the core trapped therebetween and for successfully reinforcing the panel.

The drawings do not show a washer received on the bolt before nut 46 is applied but such could be a standard procedure.

Figure 5:
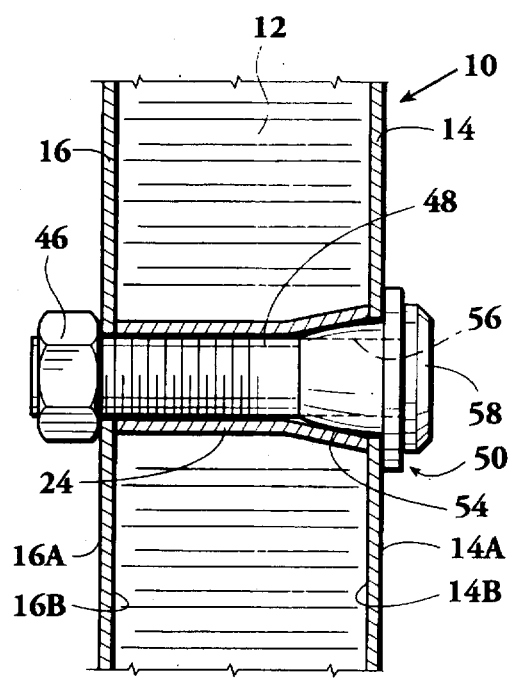
FIG. 5 is a cross-sectional view of a sandwich panel as shown in FIG. 3 showing the sleeve, bolt, flaring washer and nut in position to reinforce the panel.

FIGS. 3, 4 and 5 show an alternate embodiment that is different in only one basic respect, that is, in the alternate embodiment bolt 48 is not provided with an integral flange, such as integral flange 42 of FIGS. 1 and 2, but instead, an additional element is employed. The additional element is a flare washer 50. Flare washer 50 has an integral washer portion 52 (See FIG. 4) and inwardly and integrally of it, a flare portion 54, the flare portion having external dimensions substantially the same as the integral flare portion 42 of bolt 34 previously described. Flare washer 50 has an opening 56 therethrough by which it is slideably received on bolt 48.

Figure 6:
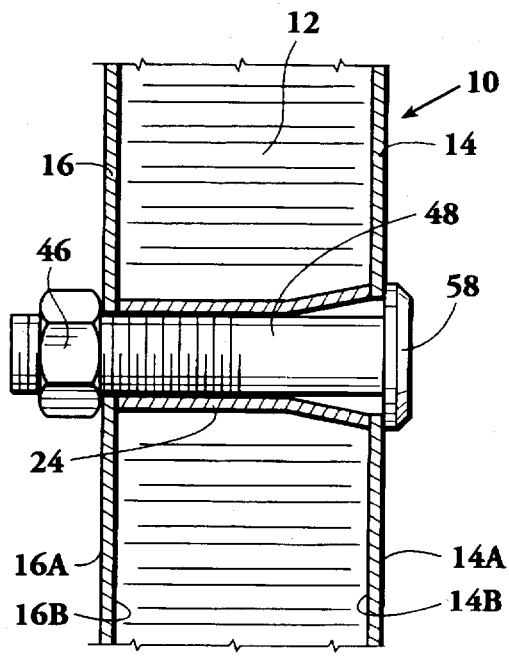
FIG. 6 is an elevational cross-sectional view of a sandwich panel as shown in FIG. 5 but with the flaring washer removed.

To practice the method of the invention using the embodiment of FIGS. 3, 4 and 5, the same procedure is employed except that flare washer 50 is positioned on bolt 48 before the bolt is inserted into the sleeve and nut 46 tightened to the position as shown in FIG. 5. Flare portion 54 performs the same function as previously described, that is, it flares by cold flowing the inner end 32 of tubular sleeve 24 without destroying the sleeve circumferential integrity so that the inner end is of larger diameter than opening 22 in first skin 14. Head 58 on bolt 48 is different than that of FIGS. 1 and 2, head 58 being of reduced and more streamlined in size. Flare washer 50 may remain as a permanent part of the structural reinforcing of panel 10 as shown in FIG. 5 or, after flaring sleeve 24, nut 46 can be removed, allowing bolt 48 and flare washer 50 to be removed, after which bolt 48 may be reinstalled as shown in FIG. 6. This permits flare washer 50 to be reused in practicing the method of the invention.

Figure 7:
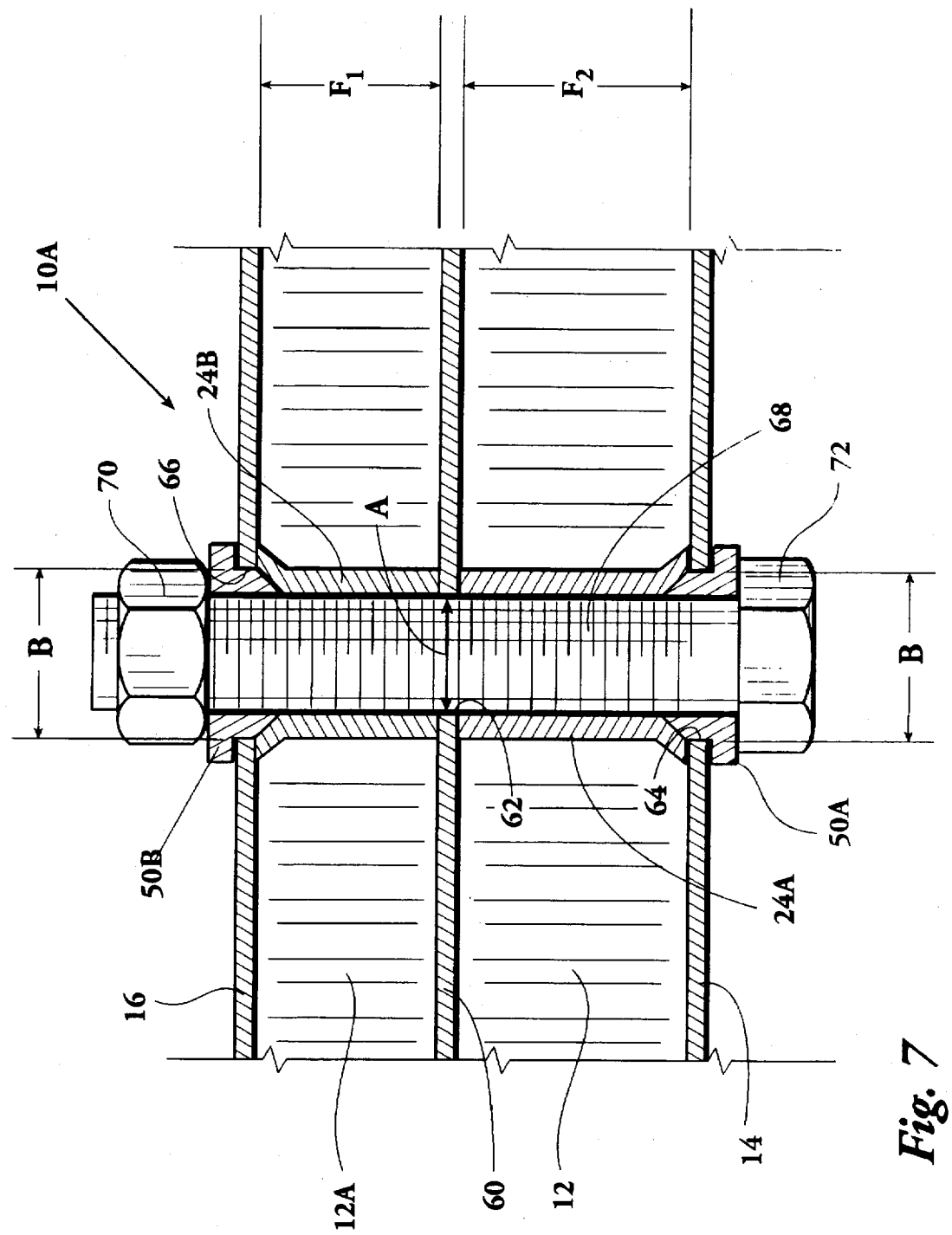
FIG. 7 is an elevational cross-sectional view of a sandwich panel having three skins, that is, a first and second skin which may also be termed an inner and outer skin, and an intermediate skin. In the embodiment of FIG. 7 a single bolt is employed to retain the inner and outer skins in position with respect to each other and with respect to the center skin. In this figure the spacing between the first skin and the intermediate skin is different than the spacing between the intermediate skin and the second skin.

FIG. 7 shows the embodiment of the invention wherein the sandwich panel 10A is formed of three skins, that is, a first skin 14 and a second skin 16 as has been previously described, and an intermediate skin 60. A first core 12 is positioned between first skin 14 and intermediate skin 60 and second core 12A is positioned between intermediate skin 60 and second skin 16.

To repair a three skin sandwich panel a first hole is drilled through the entire panel, the first drill hole penetrating skins 14, 60 and 16 and cores 12 and 12A. The first hole has a diameter "A" which is the same diameter as appears in the hole 62 formed in intermediate skin 60. Subsequently holes 60 and 62 of enlarged diameter "B" are drilled in first skin 14 and second skin 16 respectively, but not in intermediate skin 60.

A first sleeve 24A is inserted through hole 64, the length of the sleeve being substantially equal to the thickness $F_2$ of core 12. A second sleeve 24B is inserted through hole 66, the length of second sleeve 24B being substantially equal to thickness $F_1$ of core 12A, sleeves 24A and 24B each have circumferential integrity throughout their lengths. A first flare washer 50A is positioned in alignment with the drilled holes and in contact with the exterior surface of first skin 14. In like manner, a second flare washer 50B is positioned in alignment with the drilled holes and in contact with the exterior surface of second skin 16. Bolt 68 is inserted through aligned flare washer 50A, sleeve 24A, hole 62 in intermediate skin 60, sleeve 24B, and flare washer 50B. Thereafter nut 70 is attached to the bolt and tightened. The bolt head 72 engages flare washer 50A, forcing it into sleeve 24A to outwardly expand by cold flowing the end thereof so that it engages the interior surface of first skin 14. That is, the circumference of tubular sleeve 24A adjacent first skin 14 is expanded to an external diameter greater than "B" to thereby engage the interior surface of first skin 14. In like manner, flare washer 50B expands by cold flowing the end of tubular sleeve 24B to a diameter greater than "B" to thereby engage the interior surface of second skin 16. As nut 70 is tightened, sleeves 24A and 24B bear against the opposed surfaces of intermediate skin 60 so that the three skins are held in fixed relationship with respect to each other, maintaining the thickness "$F_1$" of core 12A and "$F_2$" of core 12.

In the embodiment of FIG. 7, the flare portion of each of washers 50A and 50B is precisely frusto-conical, not having a streamlined flaring portion as illustrated in FIG. 4. The function of flare washers as shown in FIG. 7 is the same as that previously described with reference to FIGS. 3 and 4, that is, the flare washers serve to expand an end of a sleeve so that the expanded end fits against the interior surface of the adjacent skin.

The method and system of this invention provide an effective and inexpensive way of reinforcing a sandwich panel, and particularly a honeycomb-type of sandwich panel utilizing a relatively inexpensive tubular member and a bolt which can either be a standard bolt with a reusable flare washer or a specially manufactured bolt having an integral flare portion. Reinforcing is accomplished without the need for welding, heat treating, soldering or any other action. Only two hole drilling operations are required, that is, the drilling of an in-line hole followed by the drilling of a coaxial enlargement hole followed by the insertion of a sleeve, a bolt and a nut which is tightened to complete the reinforcing operation. Several methods may be used to ensure that the nut does not back off during subsequent operations.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of reinforcing a sandwich panel, the panel having a first exterior skin, an intermediate skin and a second exterior skin, the skins being separated by first and second cores, the exterior skins each having an external surface and an inner surface, comprising:
   (1) boring an in-line hole through the panel to penetrate the first exterior, the intermediate and the second exterior skins and the panel cores providing a hole in the cores and the three skins of diameter A;
   (2) enlarging the hole in said first and second exterior skins to a diameter B;
   (3) inserting a first tubular sleeve into said hole in said first exterior skin, the first sleeve having a first end and a second end and a length substantially equal to the spacing between said first exterior skin and said intermediate skin;
   (4) inserting a second tubular sleeve into said second exterior skin, the second sleeve having a first end and a second end and a length substantially equal to the spacing between said second exterior skin and said intermediate skin, the second sleeve being in axial alignment with said first sleeve, the first sleeve each having a diameter greater than A and slightly less than B, the first end of each of the sleeves contacting a surface of said intermediate skin;
   (5) flaring said second end of each of said first and second sleeves to an external diameter greater than B, said second end of each of said sleeves contacting respectively said inner surfaces of said first and second exterior skins.

2. The method according to claim 1 including:
   (5) inserting a bolt through said tubular sleeves, the bolt having a head of diameter greater than B, and the head contacting said exterior surface of said first exterior skin; and
   (6) installing a nut on said bolt to contact said exterior surface of said second exterior skin.

3. The method according to claim 2 wherein the step of flaring said second end of each of said first and second sleeves includes positioning on said bolt first and second flare washers, one adjacent said bolt head engaging said first tubular sleeve second end and one adjacent said nut engaging said second tubular sleeve second end.

4. The method according to claim 1 wherein step (5) comprises inserting a bolt into said aligned tubular sleeves, the bolt having an enlarged diameter head and a frusto-conical portion adjacent the head, followed by installing a nut on said bolt, and tightening the nut on said bolt to cause said frusto-conical portion to flare said second end of said first sleeve.

5. The method according to claim 4 wherein said frusto-conical portion is removably positionable on said bolt.

6. The method according to claim 5 wherein said frusto-conical portion removably positionable on said bolt includes an integral washer portion that contacts said external surface of said first skin 12.

* * * * *

UNITED STATES PATENT AND TRADEMARK OFFICE
CERTIFICATE OF CORRECTION

PATENT NO. : 5,682,678
DATED : November 4, 1997
INVENTOR(S) : Daniel J. GALLAGHER et al.

It is certified that error appears in the above-identified patent and that said Letters Patent is hereby corrected as shown below:

Col. 5, line 17, delete "and" and substitute --end-- therefor.

Signed and Sealed this

Seventeenth Day of February, 1998

Attest:

BRUCE LEHMAN

*Attesting Officer*    *Commissioner of Patents and Trademarks*